United States Patent
Aron et al.

(10) Patent No.: US 12,460,173 B2
(45) Date of Patent: Nov. 4, 2025

(54) CONTROL OF CELL GROWTH THROUGH A TEMPERATURE FEEDBACK LOOP

(71) Applicant: Bristol-Myers Squibb Company, Princeton, NJ (US)

(72) Inventors: Kathryn L. Aron, Acton, MA (US); Jeffrey Swanberg, Maynard, MA (US)

(73) Assignee: Bristol-Myers Squibb Company, Princeton, NJ (US)

( * ) Notice: Subject to any disclaimer, the term of this patent is extended or adjusted under 35 U.S.C. 154(b) by 347 days.

(21) Appl. No.: 18/053,192

(22) Filed: Nov. 7, 2022

(65) Prior Publication Data

US 2023/0090163 A1 Mar. 23, 2023

Related U.S. Application Data

(63) Continuation of application No. 16/367,837, filed on Mar. 28, 2019, now abandoned.

(60) Provisional application No. 62/650,430, filed on Mar. 30, 2018.

(51) Int. Cl.
*C12M 1/36* (2006.01)
*C12M 1/34* (2006.01)

(52) U.S. Cl.
CPC ............ *C12M 41/48* (2013.01); *C12M 41/12* (2013.01); *C12M 41/46* (2013.01)

(58) Field of Classification Search
None
See application file for complete search history.

(56) References Cited

U.S. PATENT DOCUMENTS

| | | |
|---|---|---|
| 5,122,469 A | 6/1992 | Mather |
| 5,633,162 A | 5/1997 | Keen |
| 2019/0300841 A1 | 10/2019 | Aron et al. |

OTHER PUBLICATIONS

Randek & Mandenius "On-line soft sensing in upstream bioprocessing", available on-line Apr. 20, 2017, Critical Rev Biotech, vol. 38(1): 106-121. (Year: 2018).*
Kiss et al. "Application of a High Cell Density Capacitance Sensor to Different Microorganisms" (2016), Periodica Polytech Chem Engineer, vol. 60(4): 290-297. (Year: 2016).*
Graham, F.L., et al., "Characteristics of a human cell line transformed by DNA from human adenovirus type 5," J. Gen. Virol. 36(1):59-74, Microbiology Society, United States (1977).
Lee, J., et al., "Control of fed-batch fermentations," Biotechnol. Adv. 17:29-48, Elsevier, Netherlands (1999).
Mather, J.P., "Establishment and characterization of two distinct mouse testicular epithelial cell lines," Biol. Reprod. 23(1):243-252, Oxford Academic, United Kingdom (1982).
Mather, J.P., et al., "Culture of Testicular cells in hormone-supplemented serum-free medium," The Cell Biology of the Testis 383:44-68, Annals of the New York Academy of Science, United States (1982).
Urlaub, G., et al., "Isolation of Chinese hamster cell mutants deficient in dihydrofolate reductase activity," Proc. Natl. Acad. Sci. 77(7):4216-4220, Proceedings of the national Academy of Sciences of the United States of America, United States (1980).
Wlaschin, K.F., et al., "Fedbatch culture and dynamic nutrient feeding," Cell Culture Engineering 101:43-74, Springer, United States (2006).
Zhang, Y., et al. "Very high cell density perfusion of CHO cells anchored in a non-woven matrix-based bioreactor." Journal of Biotechnology 213: 28-41, Elsevier, Netherlands (2015).
Lu, F., et al., "Automated dynamic fed-batch process and media optimization for high productivity cell culture process development," Biotech. Bioeng. 110(1):191-205, Wiley, United States (2013).

* cited by examiner

*Primary Examiner* — Teresa E Knight
(74) *Attorney, Agent, or Firm* — Sterne, Kessler, Goldstein & Fox P.L.L.C.

(57) ABSTRACT

The present invention relates to the use of online biomass capacitance monitoring in cultures as a way to control the growth of cells through the use of a temperature control loop. In certain embodiments, a biomass capacitance probe is used to measure the cell density, and a predetermined growth curve is used to adjust the temperature in the culture.

24 Claims, 5 Drawing Sheets

… (1)

CONTROL OF CELL GROWTH THROUGH A TEMPERATURE FEEDBACK LOOP

CROSS-REFERENCE TO RELATED APPLICATIONS

This application is a continuation of U.S. application Ser. No. 16/367,837, filed Mar. 28, 2019, which claims the benefit of U.S. Provisional Application No. 62/650,430, filed Mar. 30, 2018, all of which are incorporated herein by reference in their entireties.

BACKGROUND OF THE INVENTION

Understanding cell growth is critical for developing efficient and robust bioreactor processes. Due to exponential growth characteristics, small perturbations in process conditions such as inoculation density, media composition, and pH can have large impacts on cell density and process performance. In addition standard offline measurement techniques fail to capture important data such as the exact cell peak time and density. This can make cell density based process decisions such as temperature shifting difficult to time.

There is a need in the art for mechanisms to dynamically adjust cell growth to precisely control the timing of cell growth from inoculation to peak.

SUMMARY OF THE INVENTION

In some embodiments, the invention is directed to a method of controlling the growth of cells in a bioreactor comprising: a) measuring the viable cell density of the cells growing in culture using a biomass capacitance probe; and b) utilizing a temperature control loop to adjust the growth rate of the cells.

In certain embodiments, the invention is directed to a method of modulating reactor temperature to control the growth of cells in a bioreactor comprising: a) measuring the viable cell density of the cells growing in culture using a biomass capacitance probe; and b) utilizing a temperature control loop to modulate the reactor temperature and adjust the growth rate of the cells.

In embodiments, the invention is directed to a method of minimizing the growth fluctuation of cells in a bioreactor comprising: a) measuring the viable cell density of cells growing in culture using a biomass capacitance probe; and b) utilizing a temperature control loop to adjust the growth rate of the cells.

In some embodiments, a pre-determined growth curve is utilized to adjust the temperature in the culture.

In embodiments, a bolus feed is added to the bioreactor daily. In certain embodiments, the daily bolus feed is begun starting on about day 1, about day 1.5, about day 2, about day 2.5, about day 3, about day 3.5, about day 4, about day 5, about day 6, about day 7, about day 8, about day 9 or about day 10 after the culture is inoculated. In particular embodiments, the daily bolus feed volume is about 1%, about 2%, about 3%, about 4%, about 5%, about 6%, about 7%, about 8%, about 9%, about 10%, about 15% or more of the initial working volume. In some embodiments, the daily bolus feed volume is about 3%, about 3.1%, about 3.2%, about 3.3%, about 3.4%, about 3.5%, about 3.6%, about 3.7%, about 3.8, about 3.9% or about 4% of the initial working volume. In one embodiment, the daily bolus feed volume is about 3.6% of the initial working volume.

In embodiments, a bolus feed is added to the bioreactor hourly. In certain embodiments, the hourly bolus feed is begun starting on about day 1, about day 1.5, about day 2, about day 2.5, about day 3, about day 3.5, about day 4, about day 5, about day 6, about day 7, about day 8, about day 9 or about day 10 after the culture is inoculated. In an embodiment, the hourly bolus feed is about 1/24 of the calculated volume for a daily bolus feed. In one embodiment, the hourly bolus feed is about 0.1%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.4% or about 0.5% of the initial working volume. In particular embodiments, the hourly bolus feed volume is about 0.15% of the initial working volume.

In some embodiments, the viable cell density is plotted to a temperature range of about 30-40° C. In certain embodiments, the viable cell density is plotted to a temperature range of about 31-37° C. In embodiments, daily temperature oscillations in the reactor have a peak to peak amplitude of about 10° C., about 9° C., about 8° C., about 7° C., about 6° C., about 5° C., about 4° C., about 3° C., about 2° C., about 1° C. or less.

In embodiments, the cells produce a polypeptide of interest. In certain embodiments, the polypeptide of interest is an antibody. In some embodiments, the cells are mammalian cells. In particular embodiments, the cells are CHO cells.

In embodiments, the biomass capacitance probe is an INCYTE probe.

In some embodiments, the pH of the culture is about 6.5 to about 8.0, about 7.0 to about 8.0, or about 7.0 to about 7.5. In particular embodiments, the pH of the culture is about 7.1 to about 7.4.

In embodiments, the culture is inoculated with cells at a density of about $1 \times 10^5$, about $2 \times 10^5$, about $3 \times 10^5$, about $4 \times 10^5$, about $5 \times 10^5$, about $6 \times 10^5$, about $7 \times 10^5$, about $8 \times 10^5$, about $9 \times 10^5$, or about $10 \times 10^5$ cells/ml. In particular embodiments, the culture is inoculated with cells at a density of about $6 \times 10^5$ cells/ml.

DETAILED DESCRIPTION OF THE INVENTION

Definitions of General Terms and Expressions

Figure 1:
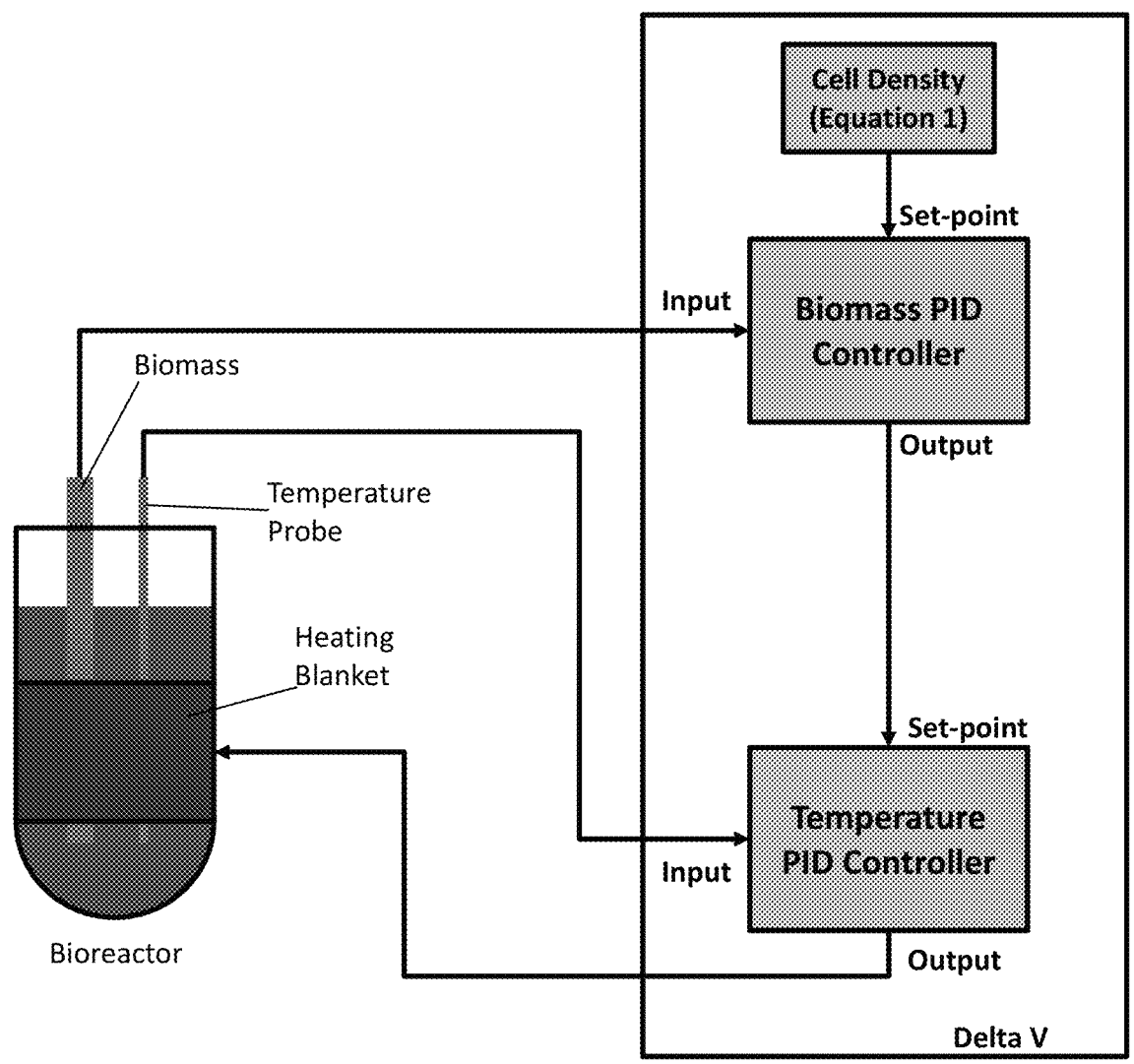
FIG. 1: Schematic for viable cell density control.

In order that the present disclosure may be more readily understood, certain terms are first defined. As used in this application, except as otherwise expressly provided herein, each of the following terms shall have the meaning set forth below. Additional definitions are set forth throughout the application.

The term "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

It is understood that wherever aspects are described herein with the language "comprising," otherwise analogous aspects described in terms of "consisting of" and/or "consisting essentially of" are also provided.

Unless defined otherwise, all technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press; The Dictionary of Cell and Molecular Biology, 3rd ed., 1999, Academic Press; and the Oxford Dictionary Of Biochemistry And Molecular Biology, Revised, 2000, Oxford University Press, provide one of skill with a general dictionary of many of the terms used in this disclosure.

Units, prefixes, and symbols are denoted in their Système International de Unites (SI) accepted form. Numeric ranges are inclusive of the numbers defining the range. The headings provided herein are not limitations of the various aspects of the disclosure, which can be had by reference to the specification as a whole. Accordingly, the terms defined immediately below are more fully defined by reference to the specification in its entirety.

The use of the alternative (e.g., "or") should be understood to mean either one, both, or any combination thereof of the alternatives. As used herein, the indefinite articles "a" or "an" should be understood to refer to "one or more" of any recited or enumerated component.

The terms "about" or "comprising essentially of" refer to a value or composition that is within an acceptable error range for the particular value or composition as determined by one of ordinary skill in the art, which will depend in part on how the value or composition is measured or determined, i.e., the limitations of the measurement system. For example, "about" or "comprising essentially of" can mean within 1 or more than 1 standard deviation per the practice in the art. Alternatively, "about" or "comprising essentially of" can mean a range of up to 10% or 20% (i.e., ±10% or ±20%). For example, about 3 mg can include any number between 2.7 mg and 3.3 mg (for 10%) or between 2.4 mg and 3.6 mg (for 20%). Furthermore, particularly with respect to biological systems or processes, the terms can mean up to an order of magnitude or up to 5-fold of a value. When particular values or compositions are provided in the application and claims, unless otherwise stated, the meaning of "about" or "comprising essentially of" should be assumed to be within an acceptable error range for that particular value or composition.

As described herein, any concentration range, percentage range, ratio range or integer range is to be understood to include the value of any integer within the recited range and, when appropriate, fractions thereof (such as one tenth and one hundredth of an integer), unless otherwise indicated.

The terms "cell culture" and "culture" include any combination of cells and medium. The methods of the present invention contemplate, without limitation, perfusion cell culture and fed-batch cell culture.

As used herein, the term "fed-batch culture" refers to a method of culturing cells, wherein the cell culture is supplemented with fresh medium, i.e., the cells are "fed" with new medium while spent medium is not removed. Typically, a "fed-batch" culture process is performed in a bioreactor and additional components (e.g., nutritional supplements) are added to the culture at some time after initiation of the culture process. The controlled addition of nutrients directly affects the growth rate of the culture and allows for avoidance of the build-up of overflow metabolites (see, for example, Wlaschin, K. F. et al., "Fedbatch culture and dynamic nutrient feeding," *Cell Culture Engineering*, 101: 43-74 (2006) and Lee, J. et al., "Control of fed-batch fermentations," *Biotechnol. Adv.*, 17:29-48 (1999)). A fed-batch culture is typically terminated at some point and the cells and/or components in the medium are harvested and optionally purified.

As used herein, the terms "inoculation", "inoculum", and "seeding" refer to the addition of cells to starting medium to begin the culture.

As used herein, the term "cell density" refers to the number of cells in a given volume of medium. Cell density can be monitored by any technique known in the art, including, but not limited to, extracting samples from a culture and analyzing the cells under a microscope, using a commercially available cell counting device or by using a commercially available suitable probe introduced into the bioreactor itself (or into a loop through which the medium and suspended cells are passed and then returned to the bioreactor). In embodiments, a biomass capacitance probe measures capacitance, which is correlated to cell density.

As used herein the terms "super high cell density" and "high cell density" are used interchangeably and refer to a cell density of at least about $40 \times 10^6$ cells/mL in a bioreactor. In embodiments, super high cell density or high cell density refers to a cell density that is at least about $40 \times 10^6$ cells/mL, $45 \times 10^6$ cells/mL, $50 \times 10^6$ cells/mL, $75 \times 10^6$ cells/mL, $100 \times 10^6$ cells/mL or higher. Known cell culture techniques may involve growing cells to a "first critical level" (i.e., a point during the cell cycle growth phase when the cell viability may be affected by the increased concentration of waste productions (e.g., cell growth inhibitors and toxic metabolites, e.g., lactate, ammonium, etc.) before perfusing the cell culture and obtaining roughly 5 to 40 million cells/mL.

As used herein, the term "viable cell density" or "VCD" refers to the number of live cells present in a given volume of medium under a given set of experimental conditions. In some embodiments, viable cell density is used interchangeably with cell density.

As used herein, the term "cell viability" refers to the ability of cells in culture to survive under a given set of conditions or experimental variations. The term as used herein also refers to that portion of cells that are alive at a particular time in relation to the total number of cells (e.g., living and dead) in the culture at that time.

As used herein, the "growth phase" of a cell culture refers to the phase during which the viable cell density at any time point is higher than at any previous time point.

As used herein, the "production phase" of a cell culture refers to the phase during which the cells produce significant amounts of protein, which accumulates for future processing.

As used herein, the term "cell integral" refers to the overall viable cell numbers during the course of a cell growth profile.

As used herein, the term "titer" refers to the total amount of protein produced by a cell culture, divided by a given amount of medium volume. In essence, the term "titer"

refers to a concentration and is typically expressed in units of milligrams of polypeptide per liter of medium.

As used herein, the terms "media", "cell culture media" and "culture media", including grammatical variations thereof, are used interchangeably, and refer to the nutrient solution in which cells (for example, animal or mammalian cells) are grown in culture. Cell culture media is the physiochemical, nutritional, and hormonal environment for cells and typically includes at least one or more components from the following: an energy source (e.g., in the form of a carbohydrate such as glucose); essential amino acids, including the twenty basic amino acids plus cysteine; vitamins and/or other organic compounds typically required at low concentrations; lipids or free fatty acids (e.g., linoleic acid); and trace elements (e.g., inorganic compounds or naturally occurring elements that are typically required at very low concentrations, usually in the micromolar range). Media may be solid, gelatinous, liquid, gaseous or a mixture of phases and materials.

As used herein, the term "cell", refers to animal cells, mammalian cells, cultured cells, host cells, recombinant cells, and recombinant host cells. Such cells are generally cell lines obtained or derived from mammalian tissues which are able to grow and survive when placed in media containing appropriate nutrients and/or growth factors. The cells utilized in the methods of the present invention are generally animal or mammalian cells that can express and secrete, or that can be molecularly engineered to express and secrete, large quantities of a particular protein into the culture medium. In one embodiment, the protein produced by the cell can be endogenous or homologous to the cell. Alternatively, the protein is heterologous, i.e., foreign, to the cell.

The cells utilized in the methods of the present invention can be grown and maintained in any number of cell culture media, including those which are known in the art or are commercially available. One of ordinary skill in the art may opt to use one or more known cell culture media that is selected to maximize cell growth, cell viability, and/or protein production in a particular cultured host cell. Exemplary cell culture media include any media suitable for culturing cells that can express a protein of interest. In some embodiments, the media is chemically defined media.

Additionally, the cell culture media can optionally be supplemented to include one or more additional components, in appropriate concentrations or amounts, as necessary or desired, and as would be known and practiced by those of ordinary skill in the art. Exemplary supplements include, but are not limited to, chemical gene selection agents, hormones and other growth factors, (e.g., insulin, transferrin, epidermal growth factor, serum, somatotropin, pituitary extract, aprotinin); salts (e.g., calcium, magnesium and phosphate), and buffers (e.g., HEPES (4-[2-Hydroxethyl]-1-piperazine-ethanesulfonic acid)); nucleosides and bases (e.g., adenosine, thymidine, hypoxanthine); protein and hydrolysates; antibiotics (e.g., gentamycin); cell protective agents (e.g., a Pluronic polyol (PLURONIC® F68)) and extracellular matrix proteins (e.g., fibronectin). Supplements that support the growth and maintenance of particular cell cultures are able to be readily determined by those of ordinary skill in the art, such as is described, for example, by Barnes et al. (Cell, 22:649 (1980)); in Mammalian Cell Culture, Mather, J. P., ed., Plenum Press, NY (1984); and in U.S. Pat. No. 5,721,121.

As used herein, the term "bioreactor" refers to any apparatus, closed container or vessel (e.g., a fermentation chamber) that is used for growing cell cultures. Bioreactors allow controlling various parameters during the cell culture process including, but not limited to, the circulation loop flow, pH, the temperature, the agitation, the gas flow rate, the feed addition, the overpressure and/or the medium perfusion rate. Bioreactors include commercially available bioreactors, classical fermenters and cell culture perfusion systems, as well as disposable bioreactors. In some embodiments, the bioreactor is a perfusion N-1 bioreactor. In other embodiments, the bioreactor is a standard batch N-1 bioreactor. In further embodiments, the bioreactor is a feed N-1 bioreactor. In embodiments, the bioreactor is a production bioreactor. In a particular embodiment, the bioreactor is a batch production bioreactor. In certain embodiments, the bioreactor is a fed-batch production bioreactor. In some embodiments, the bioreactor is a seed bioreactor.

The bioreactor can be of any size that is useful for culturing cells at a desirable scale in accordance with a method of the invention. For example, a bioreactor employed in the methods of the present invention may be at least about 0.1, 0.5, 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 340, 350, 360, 370, 380, 390, 400, 410, 420, 430, 440, 450, 460, 470, 480, 490, 500, 550, 1,000, 1,500, 2,000, 2,500, 3,000, 3,500, 4,000, 4,500, 5,000, 5,500, 6,000, 6,500, 7,000, 7,500, 8,000, 8,500, 9,000, 9,500, 10,000, 10,500, 11,000, 11,500, 12,0000, 13,000, 14,000, 15,000 liters or more, or any intermediate volume. The methods of the present invention can employ one or more bioreactors.

A suitable bioreactor may be composed of (i.e., constructed of) any material that is suitable for holding cell cultures under the culture conditions of the present invention and is conducive to cell growth and viability. For example, a bioreactor employed in the methods of the present invention can be made of glass, plastic or metal. However, the materials comprising the bioreactor should not interfere with expression or stability of the polypeptide product. Suitable bioreactors are known in the art and commercially available.

A "biomass capacitance probe" refers to a probe that can measure viable cell density, among other capabilities. A biomass capacitance probe uses capacitance to measure the viable cells in a culture. Viable cells act as capacitors in an alternating electric field. The biomass capacitance probe can measure the charge from these cells, and report it.

The cell cultures encompassed by the methods of the present invention may be grown at any temperature appropriate for the cell type and culture conditions. In one embodiment, it is desirable to use a temperature between about 30° C. and 38° C., to enhance protein production. In another embodiment, the temperature is at least about 25° C., 26° C., 27° C., 28° C., 29° C., 30° C., 31° C., 32° C., 33° C., 34° C., 35° C., 35.5° C., 36° C., 36.5° C., 37° C., 37.5° C., 38° C., 39° C., 40° C., or 41° C. or higher. It may also be desirable to use different temperatures at different times during the culture.

Bioreactor and Cultivation Process

In embodiments, the invention is directed to an optimization of a cell culture process. In embodiments, the invention is directed to a process of controlling the growth of cells. In certain embodiments, the invention is directed to a method of modulating reactor temperature to control the growth of cells. In particular embodiments, the invention is directed to a process that minimizes the growth fluctuation of cells. In particular embodiments, the process or method takes places in bioreactor. In some embodiments, the bioreactor is a tank bioreactor. In certain embodiments, the bioreactor is an N-1 bioreactor. In some embodiments, the bioreactor is a perfusion N-1 bioreactor. In other embodiments, the bioreactor is a standard batch N-1 bioreactor. In further embodiments, the bioreactor is a feed N-1 bioreactor. In embodiments, the bioreactor is a production bioreactor. In a particular embodiment, the bioreactor is a batch production bioreactor. In certain embodiments, the bioreactor is a fed-batch production bioreactor. In some embodiments, the bioreactor is a seed bioreactor. In an N-1 bioreactor, there is an intense period of growth in the bioreactor prior to the transfer of the cells into the production bioreactor, and cells grown in an N-1 bioreactor are capable of being grown to a high cell density. In certain embodiments, the bioreactor is about a 1 L, 5 L, 10 L, 50 L, 100 L, 200 L, 300 L, or 500 L bioreactor.

In certain embodiments, the growth of cells in the bioreactor is optimized by measurement of the viable cell density in the culture. In particular embodiments, the measurement of the viable cell density is used to adjust the temperature to modulate the growth rate of the cells. In particular embodiments, a temperature control loop is used to modulate the reactor temperature.

In embodiments, the viable cell density is measured using a biomass capacitance probe, also called an online capacitance probe or an online dielectric capacitance probe. In certain embodiments, the biomass capacitance probe is the Hamilton Incyte biomass capacitance probe. In particular embodiments, the biomass capacitance probe is the Incyte LC. In particular embodiments, the biomass capacitance probe is the Incyte DN. In particular embodiments, the biomass capacitance probe is the Incyte HC. In other embodiments, the biomass capacitance probe is the Incyte HC. The Incyte measures online permittivity, and provides information only on viable cells in the reactor. The information provided by the Incyte can be used to correlate to viable cell density. In particular embodiments, the probe sends a continuous biomass signal to the DeltaV control system, which controls the bioreactors. In certain embodiments, a pre-determined viable cell density is programmed into DeltaV using Equation 1. Active control is used from the time of inoculation (t=0) until peak viable cell density (t=240).

$$\text{Cell Density} = \frac{A}{B * e^{(C*(t-D))}} - e^E \qquad \text{Equation 1}$$

TABLE 1

Constants and variable definitions for Equation 1.

| | |
|---|---|
| A | 41.2 |
| B | 0.527 |
| C | −0.0165 |
| D | 178 |
| E | 0.0133 |
| t | time in hours |

In embodiments, the biomass output translates linearly to a temperature range. In certain embodiments, this temperature range is about 30-40° C. In particular embodiments, the temperature range is about 31-37° C. In some embodiments, the daily temperature oscillations in the reactor have a peak to peak amplitude of about 10° C., about 9° C., about 8° C., about 7° C., about 6° C., about 5° C., about 4° C., about 3° C., about 2° C., about 1° C. or less.

In embodiments, the pH in the bioreactor is maintained at about 6.0 to about 8.0, about 6.5 to about 8.0, about 7.0 to about 8.0, about 6.5 to about 7.5, about 6.6 to about 7.5, about 6.7 to about 7.5, about 6.8 to about 7.5, about 6.9 to about 7.5, about 7.0 to about 7.5, or about 7.1 to about 7.4. In certain embodiments, the pH in the perfusion bioreactor is maintained at about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9 or about 8.0.

In embodiments, the bioreactor is inoculated at a cell density of about $1 \times 10^5$, about $2 \times 10^5$, about $3 \times 10^5$, about $4 \times 10^5$, about $5 \times 10^5$, about $6 \times 10^5$, about $7 \times 10^5$, about $8 \times 10^5$, about $9 \times 10^5$, about $10 \times 10^5$, about $2 \times 10^6$, about $3 \times 10^6$, about $4 \times 10^6$, about $5 \times 10^6$, about $6 \times 10^6$, about $7 \times 10^6$, about $8 \times 10^6$, about $9 \times 10^6$, about $10 \times 10^6$, about $2 \times 10^7$, about $3 \times 10^7$, about $4 \times 10^7$, about $5 \times 10^7$, about $6 \times 10^7$, about $7 \times 10^7$, about $8 \times 10^7$, about $9 \times 10^7$, about $10 \times 10^7$, cells/ml or a greater cell density. In particular embodiments, the production bioreactor is inoculated at a cell density of about $6 \times 10^5$ cells/ml.

In embodiments, a bolus feed is added to the bioreactor daily. In certain embodiments, the daily bolus feed is begun starting on about day 1, about day 1.5, about day 2, about day 2.5, about day 3, about day 3.5, about day 4, about day 5, about day 6, about day 7, about day 8, about day 9 or about day 10 after the culture is inoculated. In particular embodiments, the daily bolus feed is added starting at day 3 after the culture is inoculated. In certain embodiments, the daily bolus feed volume is about 1%, about 2%, about 3%, about 4%, about 5%, about 6%, about 7%, about 8%, about 9%, about 10%, about 15% or more of the initial working volume. In particular embodiments, the daily bolus feed volume is about 3%, about 3.1%, about 3.2%, about 3.3%, about 3.4%, about 3.5%, about 3.6%, about 3.7%, about 3.8, about 3.9% or about 4% of the initial working volume. In embodiments, the daily bolus feed volume is about 3.6% of the initial working volume.

In some embodiments, a bolus feed is added to the bioreactor hourly. In certain embodiments, the hourly bolus feed is begun starting on about day 1, about day 1.5, about day 2, about day 2.5, about day 3, about day 3.5, about day 4, about day 5, about day 6, about day 7, about day 8, about day 9 or about day 10 after the culture is inoculated. In particular embodiments, the hourly feed is added starting about day 2.5 after the culture is inoculated. In particular embodiments, the hourly bolus feed is about 1/24 of the calculated volume for a daily bolus feed. In particular embodiments, the hourly bolus feed is about 0.1%, about 0.11%, about 0.12%, about 0.13%, about 0.14%, about 0.15%, about 0.16%, about 0.17%, about 0.18%, about 0.19%, about 0.2%, about 0.25%, about 0.3%, about 0.4% or about 0.5% of the initial working volume. In one embodiment, the hourly bolus feed volume is about 0.15% of the initial working volume.

Polypeptides

Any polypeptide that is expressible in a host cell may be produced in accordance with the present invention. The polypeptide may be expressed from a gene that is endogenous to the host cell, or from a gene that is introduced into the host cell through genetic engineering. The polypeptide may be one that occurs in nature, or may alternatively have a sequence that was engineered or selected by the hand of man. An engineered polypeptide may be assembled from other polypeptide segments that individually occur in nature, or may include one or more segments that are not naturally occurring.

Polypeptides that may desirably be expressed in accordance with the present invention will often be selected on the basis of an interesting biological or chemical activity. For example, the present invention may be employed to express any pharmaceutically or commercially relevant enzyme, receptor, antibody, hormone, regulatory factor, antigen, binding agent, etc.

Antibodies

Given the large number of antibodies currently in use or under investigation as pharmaceutical or other commercial agents, production of antibodies is of interest in accordance with the present invention. Antibodies are proteins that have the ability to specifically bind a particular antigen. Any antibody that can be expressed in a host cell may be used in accordance with the present invention. In an embodiment, the antibody to be expressed is a monoclonal antibody. In certain embodiments, the antibody is a polyclonal antibody.

In another embodiment, the antibody is a chimeric antibody. A chimeric antibody contains amino acid fragments that are derived from more than one organism. Chimeric antibody molecules can include, for example, an antigen binding domain from an antibody of a mouse, rat, or other species, with human constant regions. A variety of approaches for making chimeric antibodies have been described. See e.g., Morrison et al., *Proc. Natl. Acad. Sci. U.S.A.* 81, 6851 (1985); Takeda et al., *Nature* 314, 452 (1985), Cabilly et al., U.S. Pat. No. 4,816,567; Boss et al., U.S. Pat. No. 4,816,397; Tanaguchi et al., European Patent Publication EP171496; European Patent Publication 0173494, United Kingdom Patent GB 2177096B.

In another embodiment, the antibody is human antibody derived, e.g., through the use of ribosome-display or phage-display libraries (see, e.g., Winter et al., U.S. Pat. No. 6,291,159 and Kawasaki, U.S. Pat. No. 5,658,754) or the use of xenographic species in which the native antibody genes are inactivated and functionally replaced with human antibody genes, while leaving intact the other components of the native immune system (see, e.g., Kucherlapati et al., U.S. Pat. No. 6,657,103).

Five human immunoglobulin classes are defined on the basis of their heavy chain composition, and are named IgG, IgM, IgA, IgE, and IgD. The IgG-class and IgA-class antibodies are further divided into subclasses, namely, IgG1, IgG2, IgG3, and IgG4, and IgA1 and IgA2. The heavy chains in IgG, IgA, and IgD antibodies have three constant region domains, that are designated CH1, CH2, and CH3, and the heavy chains in IgM and IgE antibodies have four constant region domains, CH1, CH2, CH3, and CH4.

In another embodiment, the antibody is a humanized antibody. A humanized antibody is a chimeric antibody wherein the large majority of the amino acid residues are derived from human antibodies, thus minimizing any potential immune reaction when delivered to a human subject. In humanized antibodies, amino acid residues in the complementarity determining regions are replaced, at least in part, with residues from a non-human species that confer a desired antigen specificity or affinity. Such altered immunoglobulin molecules can be made by any of several techniques known in the art, (e.g., Teng et al., *Proc. Natl. Acad. Sci. USA.*, 80, 7308-7312 (1983); Kozbor et al., *Immunology Today*, 4, 7279 (1983); Olsson et al., *Meth. Enzymol.*, 92, 3-16 (1982)), and are made according to the teachings of PCT Publication WO92/06193 or EP 0239400, all of which are incorporated herein by reference). Humanized antibodies can also be commercially produced. For further reference, see Jones et al., *Nature* 321:522-525 (1986); Riechmann et al., *Nature* 332:323-329 (1988); and Presta, *Curr. Op. Struct. Biol.* 2:593-596 (1992), all of which are incorporated herein by reference.

In still another embodiment, the monoclonal, polyclonal, chimeric, or humanized antibodies described above may contain amino acid residues that do not naturally occur in any antibody in any species in nature. These foreign residues can be utilized, for example, to confer novel or modified specificity, affinity or effector function on the monoclonal, chimeric or humanized antibody. In another embodiment, the antibodies described above may be conjugated to drugs for systemic pharmacotherapy, such as toxins, low-molecular-weight cytotoxic drugs, biological response modifiers, and radionuclides (see e.g., Kunz et al., Calicheamicin derivative-carrier conjugates, US20040082764 A1).

Cells

Any mammalian cell or cell type susceptible to cell culture, and to expression of polypeptides, may be utilized in accordance with the present invention. Non-limiting examples of mammalian cells that may be used in accordance with the present invention include BALB/c mouse myeloma line (NSW, ECACC No: 85110503); human retinoblasts (PER.C6 (CruCell, Leiden, The Netherlands)); monkey kidney CV1 line transformed by SV40 (COS-7, ATCC CRL 1651); human embryonic kidney line (293 or 293 cells subcloned for growth in suspension culture, Graham et al., *J. Gen Virol.*, 36:59 (1977)); baby hamster kidney cells (BHK, ATCC CCL 10); Chinese hamster ovary cells±DHFR or ±GS (CHO, Urlaub and Chasin, *Proc. Natl. Acad. Sci. USA*, 77:4216 (1980)); mouse sertoli cells (TM4, Mather, *Biol. Reprod.*, 23:243-251 (1980)); monkey kidney cells (CV1 ATCC CCL 70); African green monkey kidney cells (VERO-76, ATCC CRL-1 587); human cervical carcinoma cells (HeLa, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); mouse mammary tumor (MMT 060562, ATCC CCLS 1); TRI cells (Mather et al., Annals N.Y. Acad. Sci., 383:44-68 (1982)); MRC 5 cells; FS4 cells; and a human hepatoma line (Hep G2). In a particularly embodiment, the present invention is used in the culturing of and expression of polypeptides and proteins from CHO cell lines.

Additionally, any number of commercially and non-commercially available hybridoma cell lines that express polypeptides or proteins may be utilized in accordance with the present invention. One skilled in the art will appreciate that hybridoma cell lines might have different nutrition requirements and/or might require different culture conditions for optimal growth and polypeptide or protein expression, and will be able to modify conditions as needed.

As noted above, in many instances the cells will be selected or engineered to produce high levels of protein or polypeptide. Often, cells are genetically engineered to produce high levels of protein, for example by introduction of a gene encoding the protein or polypeptide of interest and/or by introduction of control elements that regulate expression of the gene (whether endogenous or introduced) encoding the polypeptide of interest.

Certain polypeptides may have detrimental effects on cell growth, cell viability or some other characteristic of the cells that ultimately limits production of the polypeptide or protein of interest in some way. Even amongst a population of cells of one particular type engineered to express a specific polypeptide, variability within the cellular population exists such that certain individual cells will grow better and/or produce more polypeptide of interest. In certain embodiments of the present invention, the cell line is empirically selected by the practitioner for robust growth under the particular conditions chosen for culturing the cells. In particular embodiments, individual cells engineered to express a particular polypeptide are chosen for large-scale production based on cell growth, final cell density, percent cell viability, titer of the expressed polypeptide or any combination of these or any other conditions deemed important by the practitioner.

Media and Culture Conditions

In some embodiments, a mammalian host cell is cultured under conditions that promote the production of the polypeptide of interest, any polypeptide disclosed herein. Basal cell culture medium formulations are well known in the art. To these basal culture medium formulations the skilled artisan will add components such as amino acids, salts, sugars, vitamins, hormones, growth factors, buffers, antibiotics, lipids, trace elements and the like, depending on the requirements of the host cells to be cultured. The culture medium may or may not contain serum and/or protein. Various tissue culture media, including serum-free and/or defined culture media, are commercially available for cell culture. Tissue culture media is defined, for purposes of the invention, as a media suitable for growth of animal cells, and, in some embodiments, mammalian cells, in in vitro cell culture. Typically, tissue culture media contains a buffer, salts, energy source, amino acids, vitamins and trace essential elements. Any media capable of supporting growth of the appropriate eukaryotic cell in culture can be used; the invention is broadly applicable to eukaryotic cells in culture, particularly mammalian cells, and the choice of media is not crucial to the invention. Tissue culture media suitable for use in the invention are commercially available from, e.g., ATCC (Manassas, Va.). For example, any one or combination of the following media can be used: RPMI-1640 Medium, RPMI-1641 Medium, Dulbecco's Modified Eagle's Medium (DMEM), Minimum Essential Medium Eagle, F-12K Medium, Ham's F12 Medium, Iscove's Modified Dulbecco's Medium, McCoy's 5A Medium, Leibovitz's L-15 Medium, and serum-free media such as EX-CELL™ 300 Series (available from JRH Biosciences, Lenexa, Kans., USA), among others, which can be obtained from the American Type Culture Collection or JRH Biosciences, as well as other vendors. When defined medium that is serum-free and/or peptone-free is used, the medium is usually highly enriched for amino acids and trace elements. See, for example, U.S. Pat. No. 5,122,469 to Mather et al. and U.S. Pat. No. 5,633,162 to Keen et al.

In certain embodiments, cells can be grown in serum-free, protein-free, growth factor-free, and/or peptone-free media. The term "serum-free" as applied to media includes any mammalian cell culture medium that does not contain serum, such as fetal bovine serum. The term "insulin-free" as applied to media includes any medium to which no exogenous insulin has been added. By exogenous is meant, in this context, other than that produced by the culturing of the cells themselves. The term "IGF-1-free" as applied to media includes any medium to which no exogenous Insulin-like growth factor-1 (IGF-1) or analog (such as, for example, LongR3, [Ala31], or [Leu24][Ala31] IGF-1 analogs available from GroPep Ltd. of Thebarton, South Australia) has been added. The term "growth-factor free" as applied to media includes any medium to which no exogenous growth factor (e.g., insulin, IGF-1) has been added. The term "protein-free" as applied to media includes medium free from exogenously added protein, such as, for example, transferrin and the protein growth factors IGF-1 and insulin. Protein-free media may or may not have peptones. The term "peptone-free" as applied to media includes any medium to which no exogenous protein hydrolysates have been added such as, for example, animal and/or plant protein hydrolysates. Eliminating peptone from media has the advantages of reducing lot to lot variability and enhancing processing such as filtration. Chemically defined media are media in which every component is defined and obtained from a pure source, in certain embodiments, a non-animal source. In certain embodiments, the media is chemically defined and fully serum and protein free.

In some embodiments, one of the many individualized media formulations that have been developed to maximize cell growth, cell viability, and/or recombinant polypeptide production in a particular cultured host cell is utilized. The methods described herein may be used in combination with commercially available cell culture media or with a cell culture medium that has been individually formulated for use with a particular cell line. For example, an enriched medium that could support increased polypeptide production may comprise a mixture of two or more commercial media, such as, for instance, DMEM and Ham's F1 2 media combined in ratios such as, for example, 1:1, 1:2, 1:3, 1:4, 1:5, 1:6, 1:7, 1:8, or even up to 1:15 or higher. Alternatively or in addition, a medium can be enriched by the addition of nutrients, such as amino acids or peptone, and/or a medium (or most of its components with the exceptions noted below) can be used at greater than its usual, recommended concentration, for example at 2×, 3×, 4×, 5×, 6×, 7×, 8×, or even higher concentrations. As used herein, "1×" means the standard concentration, "2×" means twice the standard concentration, etc. In any of these embodiments, medium components that can substantially affect osmolarity, such as salts, cannot be increased in concentration so that the osmolarity of the medium falls outside of an acceptable range. Thus, a medium may, for example, be 8× with respect to all components except salts, which can be present at only 1×. An enriched medium may be serum free and/or protein free. Further, a medium may be supplemented periodically during the time a culture is maintained to replenish medium components that can become depleted such as, for example, vitamins, amino acids, and metabolic precursors. As is known in the art, different media and temperatures may have somewhat different effects on different cell lines, and the same medium and temperature may not be suitable for all cell lines.

Suitable culture conditions for mammalian cells are known in the art. See e.g. Animal cell culture: A Practical Approach, D. Rickwood, ed., Oxford university press, New York (1992). Mammalian cells may be cultured in suspension or while attached to a solid substrate. Furthermore, mammalian cells may be cultured, for example, in fluidized bed bioreactors, hollow fiber bioreactors, roller bottles, shake flasks, or stirred tank bioreactors or any other bioreactor described herein or known in the art, with or without microcarriers, and operated in a batch, fed batch, continuous, semi-continuous, or perfusion mode.

Monitoring Culture Conditions

In certain embodiments of the present invention, the practitioner may find it beneficial or necessary to periodically monitor particular conditions of the growing cell culture. Monitoring cell culture conditions allows the practitioner to determine whether the cell culture is producing recombinant polypeptide or protein at suboptimal levels or whether the culture is about to enter into a suboptimal production phase. In order to monitor certain cell culture conditions, it will be necessary to remove small aliquots of the culture for analysis. One of ordinary skill in the art will understand that such removal may potentially introduce contamination into the cell culture, and will take appropriate care to minimize the risk of such contamination.

As non-limiting example, it may be beneficial or necessary to monitor temperature, pH, cell density, cell viability, integrated viable cell density, lactate levels, ammonium levels, osmolarity, or titer of the expressed polypeptide or protein. Numerous techniques are well known in the art that will allow one of ordinary skill in the art to measure these conditions. For example, cell density may be measured using a hemacytometer, a Coulter counter, or Cell density examination (CEDEX). Viable cell density may be determined by staining a culture sample with Trypan blue. Since only dead cells take up the Trypan blue, viable cell density can be determined by counting the total number of cells, dividing the number of cells that take up the dye by the total number of cells, and taking the reciprocal. Cell viability and/or cell density can also be measured using a biomass capacitance probe. HPLC, UPLC, NOVA Flex or Cedex Bio can be used to determine the levels of lactate, ammonium or the expressed polypeptide or protein. Alternatively, the level of the expressed polypeptide or protein can be determined by standard molecular biology techniques such as coomassie staining of SDS-PAGE gels, Western blotting, Bradford assays, Lowry assays, Biuret assays, and UV absorbance. It may also be beneficial or necessary to monitor the post-translational modifications of the expressed polypeptide or protein, including phosphorylation and glycosylation.

EXAMPLES

Example 1

The following example describes the use of a biomass capacitance probe to precisely control cell growth as measured through the capacitance probe by modulating reactor temperature.

Cell Line and Cell Culture Medium

A BMS-proprietary cell culture medium and a proprietary recombinant CHO cell line expressing IgG antibodies were used for the experiments. The cell culture medium was chemically defined and fully serum and protein free. Recombinant IgG producing CHO cells were maintained in suspension culture in 250-mL, 1-L and 3 L shake flasks. A $CO_2$ shaker incubator (Kuhner) was used for incubation at 36.5° C., 150 rpm at a $CO_2$ concentration of 5%.

Bench-Style Bioreactors and Cultivation Conditions

Bench scale reactor cultivations were carried out in 5-L stirred tank reactors (Sartorius). All the 5-L reactors were equipped with two 45° pitched tri-blade impellers, pH, DO (dissolved oxygen) and biomass capacitance probes. The working volume of the 5-L bioreactor was 4.5 L. pH was controlled in the range of 7.1 to 7.4 by the addition of 1M sodium carbonate and $CO_2$ gas sparging. The impeller agitation was set at 290 rpm, and aeration was provided by pure oxygen sparging through 0.5 mm drilled hole spargers. Dissolved oxygen was maintained at a level of 40% via cascade oxygen sparging. Antifoam (EX-CELL antifoam, Sigma-Aldrich) was added to the bioreactor to control foam levels. The cells were inoculated at a density of $6 \times 10^5$ cells/ml. Cell density was measured by daily offline measurements (Vi-cell, Beckman Coulter) and/or via online capacitance probes (Hamilton). Daily offline samples were also monitored for pH, dissolved oxygen and $pCO_2$ via pHOx instruments (Nova Biomedical) and glucose, lactate profiles were measured with Cedex Bio HT (Roche). After centrifugation for 5 min at 1000 g, cell-free samples were frozen at −80° C. before measurement of IgG titer by UPLC methods.

Two feeding strategies were employed: daily and hourly bolus feeding. Daily bolus feeds of chemically defined media were added to the production vessel starting from day 3. The daily feed volume was set to 3.6% of initial working volume. For hourly feeds, the normal daily bolus amount was divided by 24 (0.15% of initial working volume). This hourly amount of feed was added to the reactor hourly starting at day 2.5.

Strategy for Control of Cell Growth in Production Bioreactors

The control strategy is diagramed in FIG. 1. The biomass was measured using a Hamilton Incyte capacitance biomass probe. The probe sends a continuous biomass signal to the DeltaV control system, which controls the bioreactors. A pre-determined viable cell density was programmed into DeltaV using Equation 1, and the constants and variables in Table 1 were used.

$$\text{Cell Density} = \frac{A}{B * e^{(C*(t-D))}} - e^E \qquad \text{Equation 1}$$

Figure 2:
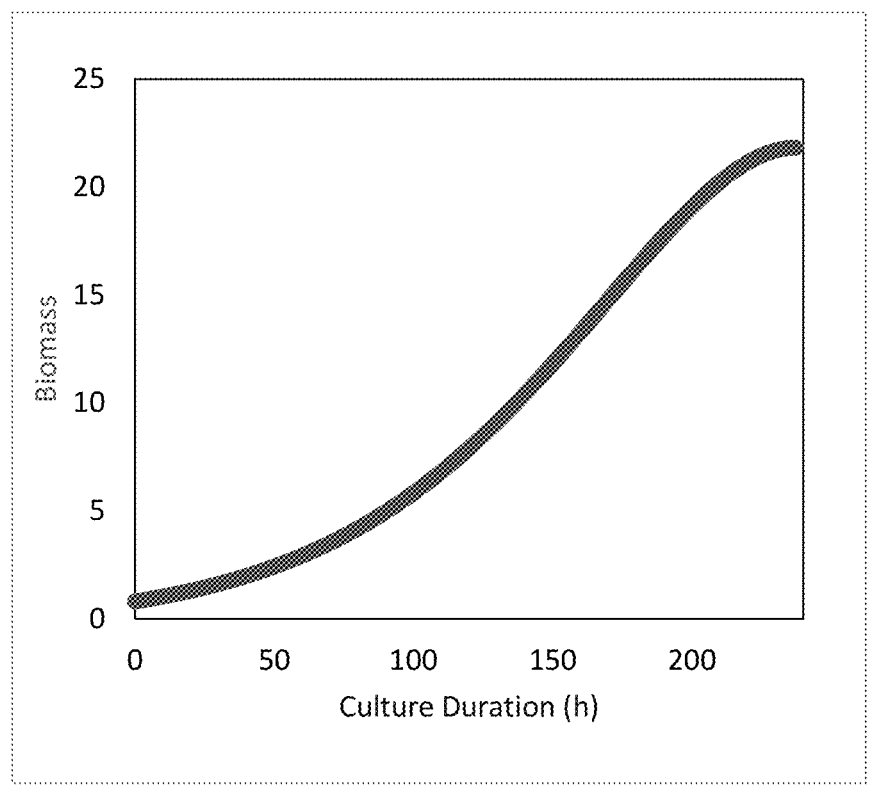
FIG. 2: Viable cell density target.

Active control was used from the time of inoculation (t=0) until peak viable cell density (t=240 h). The shape of Equation 1 over that time frame is shown in FIG. 2.

The biomass measured from the capacitance probe was controlled using a proportional-integral-derivative (PID) controller with the viable cell density from Equation 1 as the set-point. The PID values for the two feed strategies are found in Table 2.

TABLE 2

| PID settings | | |
| --- | --- | --- |
| Strategy | Daily | Hourly |
| P (gain) | 2 | 1 |
| I (s) | 400 | 60 |
| D (s) | 600 | 0 |
| Filter (s) | 300 | 300 |

The set point for the reactor temperature controller was cascaded from the biomass control loop described above. The biomass output was translated linearly to a temperature range of 31-37° C. The controller maintained this set-point temperature through a heating blanket attached to the reactor.

Cell Growth with Traditional Temperature Settings

Figure 3:
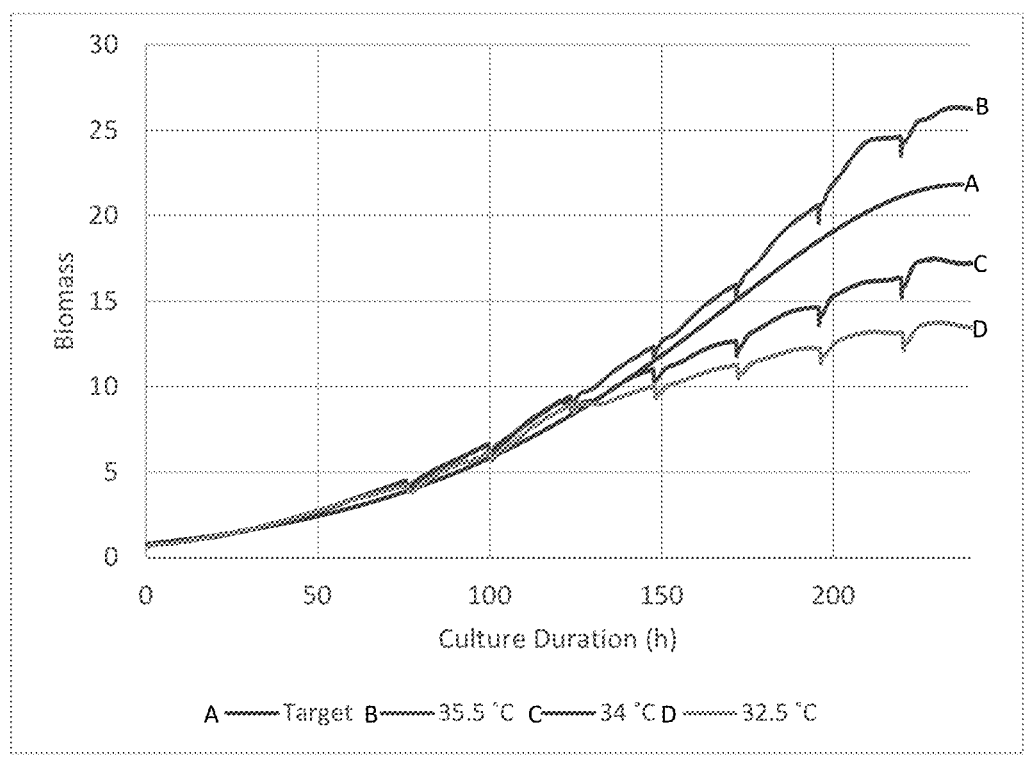
FIG. 3: Cultures grown shifted from 36.5° C. to either 35.5° C., 34.0° C., or 32.5° C. on day 5. Perturbations correspond to daily feeding events. Cultures are overlaid with a target line, as described by Equation 1.

As a control, three reactor cultures were grown using a standard temperature shift. In these reactors, the temperature was maintained at 36.5° C. for the first five days of culture, at which point the temperature was lowered to 35.5, 34.0, or 32.5° C., as can be seen in FIG. 3.

Two PID control strategies were used as described in Table 2. The temperature and biomass profiles are presented in FIG. 4 for the daily feed, and in FIG. 5 for the hourly feed.

The above experiments were designed to precisely control cell growth as measured through an online capacitance probe by modulating reactor temperature. To achieve these results reactors were equipped with an online dielectric capacitance probe which uses permittivity to measure biomass density. To avoid major perturbations near continuous feeding strategies were used. Biomass measurements from the probe were compared to a pre-determined growth curve selected by the experiment operator. A temperature control loop was then used to adjust the growth rate of the cells to match the pre-determined growth curve. This allowed precise control of the timing of cell growth from inoculation to peak.

Figure 4:
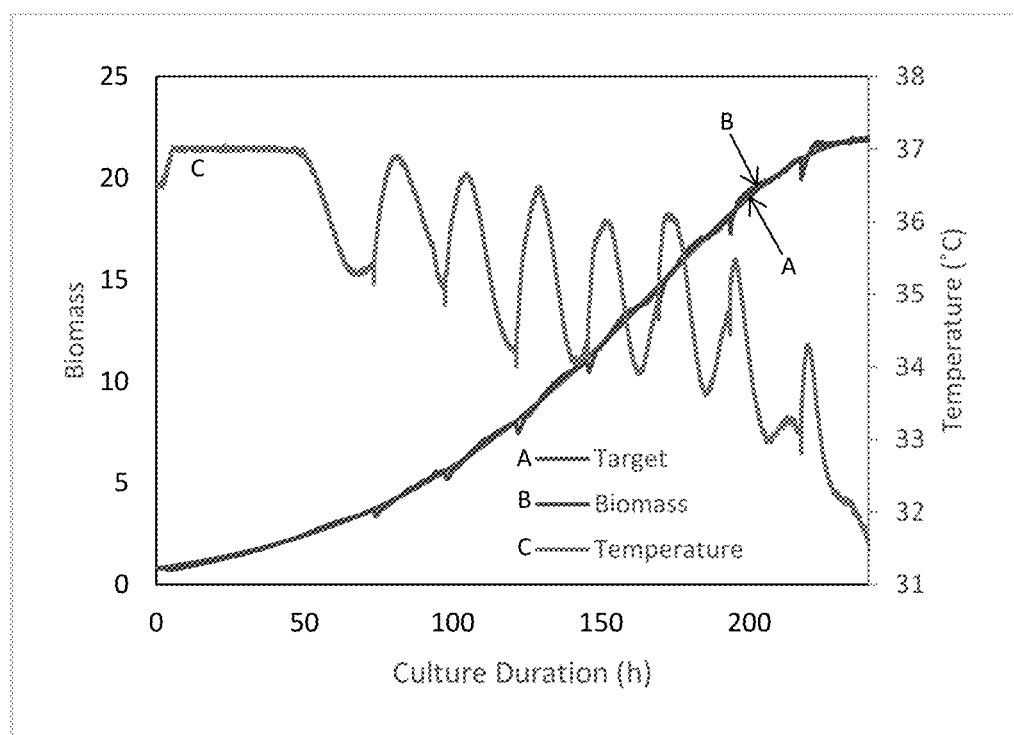
FIG. 4: Biomass control with a daily feeding schedule. Oscillations in the temperature plot align with the daily feed schedule.
Figure 5:
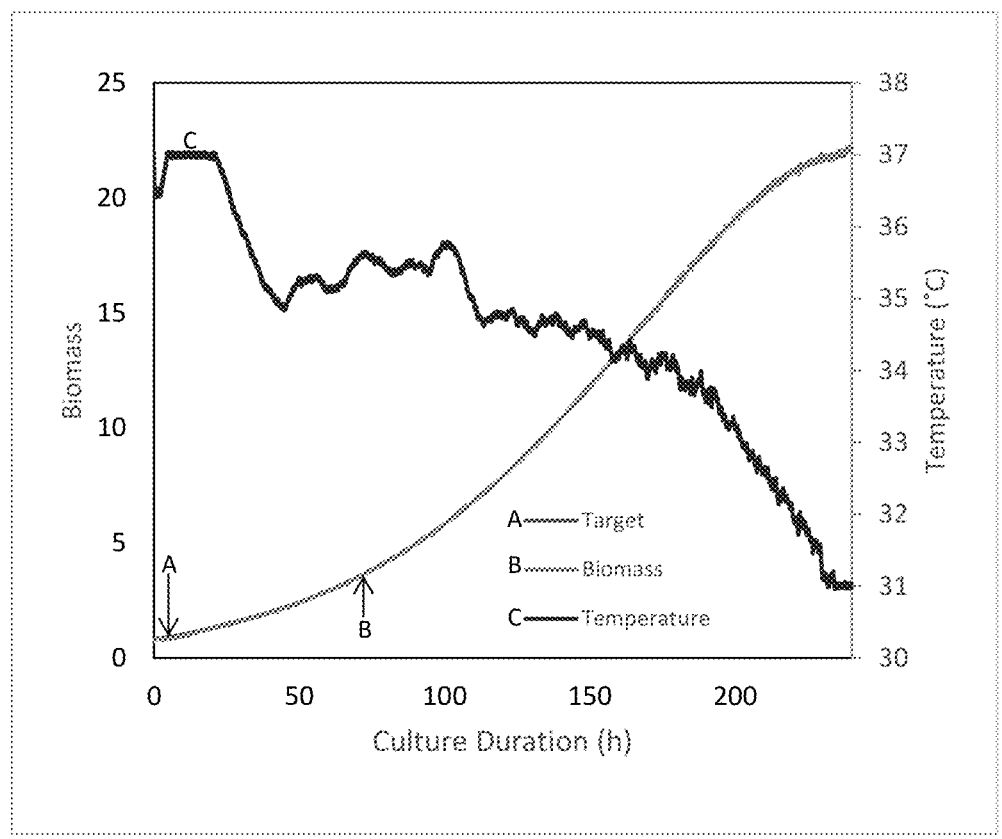
FIG. 5: Biomass control with an hourly feeding schedule. The target line is completely occluded by the biomass line.

These experiments demonstrated it is possible to precisely control biomass growth in a reactor using a feedback loop set up with an online capacitance probe. Two strategies were presented. The first strategy utilized a standard daily feed schedule as shown in FIG. 4. Biomass was still controlled using this strategy, but deviations from the target line occurred after feeding events. The biomass control loop moved to correct these deviations, resulting in daily temperature oscillations with a peak to peak amplitude of approximately 2° C.

Alternatively, an hourly feed schedule was utilized in the second strategy. By feeding the culture on an hourly basis, large biomass fluctuations were minimized. Biomass control was achieved with minimal deviations from the target. The temperature profile was also less volatile, and did not have any periodic oscillations.

Identical bioreactors can also be controlled to peak at distinct times separated by a full day, or at distinct densities. These results demonstrate new opportunities to improve mammalian process performance through more precisely controlled experimental designs and increased robustness in the face of process variability.

The invention claimed is:

1. A method of controlling the growth of cells in a bioreactor comprising:
a) measuring the viable cell density of the cells growing in culture using a biomass capacitance probe; and
b) utilizing a temperature control loop to adjust the growth rate of the cells, wherein the temperature control loop utilizes a pre-determined growth curve and the measurement of the viable cell density in step a), wherein the biomass capacitance probe sends the measurement of the viable cell density in step a) to a control system, and wherein the control system continuously adjusts the temperature in the culture, wherein daily temperature oscillations in the reactor have a peak to peak amplitude of about 5° C. or less.

2. The method of claim 1, wherein a bolus feed is added to the bioreactor daily.

3. The method of claim 2, wherein the daily bolus feed is begun starting on about day 3 after the culture is inoculated in the bioreactor.

4. The method of claim 2, wherein the daily bolus feed volume is about 1% or more of an initial working volume in the bioreactor.

5. The method of claim 2, wherein the daily bolus feed volume is about 3% of an initial working volume in the bioreactor.

6. The method of claim 2, wherein the daily bolus feed volume is about 3.6% of an initial working volume in the bioreactor.

7. The method of claim 1, wherein a bolus feed is added to the bioreactor hourly.

8. The method of claim 7, wherein the hourly bolus feed is begun starting on about day 2.5 after the culture is inoculated in the bioreactor.

9. The method of claim 7, wherein the hourly bolus feed is about 1/24 of the calculated volume for a daily bolus feed.

10. The method of claim 7, wherein the hourly bolus feed is about 0.1% to about 0.5% of an initial working volume in the bioreactor.

11. The method of claim 7, wherein the hourly bolus feed volume is about 0.15% of an initial working volume in the bioreactor.

12. The method of claim 1, wherein the viable cell density is plotted to a temperature range of about 30-40° C.

13. The method of claim 1, wherein the viable cell density is plotted to a temperature range of about 31-37° C.

14. The method of claim 1, wherein the cells produce a polypeptide of interest.

15. The method of claim 14, wherein the polypeptide of interest is an antibody.

16. The method of claim 1, wherein the cells are mammalian cells.

17. The method of claim 1, wherein the cells are Chinese Hamster Ovary (CHO) cells.

18. The method of claim 1, wherein the biomass capacitance probe is an INCYTE probe.

19. The method of claim 1, wherein the pH of the culture is about 6.5 to about 8.0.

20. The method of claim 1, wherein the pH of the culture is about 7.1 to about 7.4.

21. The method of claim 1, wherein the culture is inoculated with cells at a density of about $1 \times 10^5$ to about $10 \times 10^5$ cells/ml.

22. The method of claim 1, wherein the culture is inoculated with cells at a density of about $6 \times 10^5$ cells/ml.

23. The method of claim 1, wherein daily temperature oscillations in the reactor have a peak to peak amplitude of about 2° C. or less.

24. The method of claim 1, wherein daily temperature oscillations in the reactor have a peak to peak amplitude of about 4° C. or less.

* * * * *